United States Patent
Easley, Jr. et al.

(10) Patent No.: US 7,464,540 B2
(45) Date of Patent: Dec. 16, 2008

(54) AMMONIA PRODUCING ENGINE UTILIZING OXYGEN SEPARATION

(75) Inventors: William Lanier Easley, Jr., Dunlap, IL (US); Gerald Nelson Coleman, Petersborough (GB); Wade James Robel, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 79 days.

(21) Appl. No.: 11/443,081

(22) Filed: May 31, 2006

(65) Prior Publication Data

US 2007/0277506 A1 Dec. 6, 2007

(51) Int. Cl.
*F01N 3/00* (2006.01)

(52) U.S. Cl. ............... 60/285; 60/274; 60/276; 60/278; 60/279; 60/297; 60/301; 123/567; 123/585

(58) Field of Classification Search ............ 60/274, 60/276, 278, 285, 286, 290, 297, 301, 279; 123/26, 567, 585

See application file for complete search history.

(56) References Cited

U.S. PATENT DOCUMENTS

| | | | |
|---|---|---|---|
| 5,517,978 A * | 5/1996 | Yi | 123/585 |
| 5,649,517 A | 7/1997 | Poola et al. | |
| 5,746,052 A | 5/1998 | Kinugasa et al. | |
| 5,960,777 A * | 10/1999 | Nemser et al. | 123/585 |
| 5,964,088 A | 10/1999 | Kinugasa et al. | |
| 5,974,793 A | 11/1999 | Kinugasa et al. | |
| 6,047,542 A | 4/2000 | Kinugasa et al. | |
| 6,119,452 A | 9/2000 | Kinugasa et al. | |
| 6,122,909 A * | 9/2000 | Murphy et al. | 60/286 |
| 6,176,079 B1 | 1/2001 | Konrad et al. | |
| 6,722,352 B2 * | 4/2004 | Smolarek et al. | 123/585 |
| 6,742,507 B2 * | 6/2004 | Keefer et al. | 123/585 |
| 6,915,629 B2 | 7/2005 | Szymkowicz | |
| 6,959,540 B2 | 11/2005 | Itoh et al. | |
| 7,055,311 B2 * | 6/2006 | Beutel et al. | 60/285 |
| 2004/0159096 A1 | 8/2004 | Yasui et al. | |

FOREIGN PATENT DOCUMENTS

| | | | | |
|---|---|---|---|---|
| JP | 04365920 | | 12/1992 | |
| JP | 09004441 A | * | 1/1997 | 60/285 |

* cited by examiner

*Primary Examiner*—Binh Q. Tran
(74) *Attorney, Agent, or Firm*—Finnegan, Henderson, Farabow, Garrett & Dunner

(57) ABSTRACT

A power system is provided having a power source, a first power source section with a first intake passage and a first exhaust passage, a second power source section with a second intake passage and a second exhaust passage, and an oxygen separator. The second intake passage may be fluidly isolated from the first intake passage.

20 Claims, 3 Drawing Sheets

AMMONIA PRODUCING ENGINE UTILIZING OXYGEN SEPARATION

U.S. GOVERNMENT RIGHTS

This invention was made with government support under the terms of Contract No. DE-FC05-00OR22806 awarded by the Department of Energy. The government may have certain rights in this invention.

TECHNICAL FIELD

This disclosure pertains generally to exhaust-gas purification systems for engines, and more particularly, to selective catalytic reduction systems with on-board ammonia production.

BACKGROUND

Conventional diesel powered systems for engines, factories, and power plants typically produce emissions that contain a variety of pollutants. These pollutants may include, for example, particulate matter, nitrogen oxides (NOx), and sulfur compounds. Due to heightened environmental concerns, diesel powered engine exhaust emission standards have become increasingly stringent. The amount of pollutants in the exhaust stream may be regulated depending on the type, size, and/or class of engine.

One method that has been considered by engine manufacturers for complying with the regulations of exhaust stream pollutants has included the employment of an oxygen separation device. The oxygen separation device removes oxygen from air being supplied to the cylinders of a conventional engine and then discharges the removed oxygen back into the ambient air. Reducing the amount of oxygen entering the engine cylinders is an effective means for reducing NOx emissions. However, the separation of oxygen from the intake stream requires work which adversely affects fuel efficiency. In addition, by releasing the separated oxygen into the ambient air, the method wastes oxygen that could be used to oxidize additional fuel to increase engine power density.

Another method used to reduce emissions is selective catalytic reduction (SCR). SCR provides a method for removing NOx emissions from internal combustion engine systems. During SCR, a catalyst facilitates a reaction between exhaust-gas ammonia and NOx to produce water vapor and nitrogen gas, thereby removing NOx from the exhaust gas.

The ammonia that is used for the SCR system may be produced during the operation of the NOx-producing system or may be stored for injection when needed. Because of the high reactivity of ammonia, storage of ammonia can be hazardous. Further, on-board production of ammonia can be costly and may require specialized equipment.

One method of on-board ammonia production for an engine is disclosed in U.S. Pat. No. 6,047,542, issued to Kinugasa (hereinafter the '542 patent). The method includes the use of multiple engine cylinder groups for purifying exhaust gas. In the method of the '542 patent, the exhaust gas of two engine cylinder groups may be made rich by controlling the amount of fuel injected into the cylinder groups. Increasing the amount of fuel creates a rich combustion. The rich exhaust gas of the first engine cylinder group may then be passed through an ammonia-synthesizing catalytic chamber to convert a portion of the NOx in the exhaust gas into ammonia. The exhaust gas and ammonia of the first engine cylinder group are then combined with the exhaust gas of a second engine cylinder group and passed through an SCR catalytic chamber where the ammonia reacts with NOx to produce nitrogen gas and water vapor.

While the method of the '542 patent may reduce NOx from an exhaust stream through use of on-board ammonia production, the method of the '542 patent has several drawbacks. For example, varying the amount of fuel in order to control the leanness or richness of exhaust gas might use more fuel than preferred. Furthermore, by using the method of the '542 patent, it may be more difficult to provide adequate and controlled air intake to both cylinder groups.

The present disclosure is directed at overcoming one or more of the problems or disadvantages in the prior art.

SUMMARY OF THE INVENTION

In one aspect, the present disclosure is directed to a power system. The power system may include a power source, a first power source section with a first intake passage and a first exhaust passage, a second power source section with a second intake passage and a second exhaust passage, and an oxygen separator. The first and second power source sections may include one or more cylinders. In addition, the first intake passage may be fluidly isolated from the second intake passage. Moreover, the oxygen separator may be fluidly connected with each intake passage.

In another aspect, the present disclosure is directed to a method of operating a power system. The method may include supplying air through a first intake passage to a first power source section, which may include one or more cylinders, and supplying air through a second intake passage to a second power source section which may include one or more cylinders. In addition, the second intake passage may be fluidly isolated from the first intake passage. The method may also include separating oxygen from air being supplied to the second intake passage and directing the separated oxygen to air being supplied to the first power source section. The method may further include supplying a first exhaust stream to a first exhaust passage in fluid communication with the at least one cylinder of the first power source section and supplying a second exhaust stream to a second exhaust passage in fluid communication with the at least one cylinder of the second power source section.

In yet another aspect, the present disclosure may be directed to a machine that includes a power system including a power source, a first power source section comprising at least one cylinder with a first intake passage and a first exhaust passage. The machine may also include a second power source section comprising at least one cylinder with a second intake passage and a second exhaust passage, wherein the first intake passage may be fluidly isolated from the second intake passage. The machine may further include an oxygen separator configured to separate oxygen from air being supplied to the second power source section and direct the separated oxygen to air being supplied to the first power source section. Furthermore, the machine include a first forced-induction system coupled to the first power source section and the oxygen separator and a second forced-induction system coupled to the second power source section and the oxygen separator.

DETAILED DESCRIPTION

Figure 1:
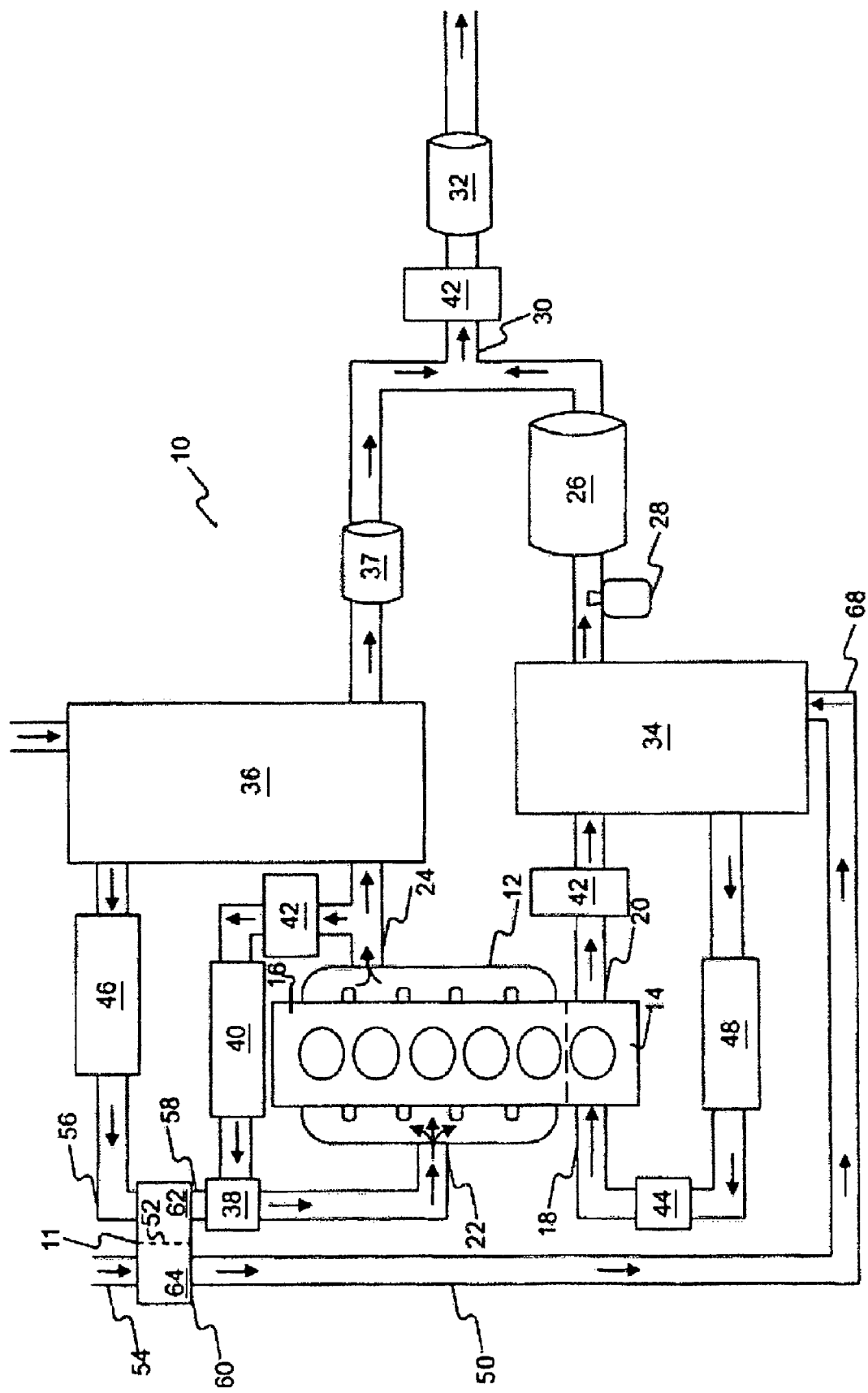
FIG. 1 provides a schematic diagram of a power source according to an exemplary disclosed embodiment of the present disclosure.

FIG. 1 provides a schematic representation of a power system 10 with on-board ammonia production and oxygen separation. The system 10 may include a power source 12 having a first power source section 14 which may include one or more engine cylinders and a second power source section 16 which may include one or more engine cylinders. First power source section 14 may fluidly communicate with a first intake passage 18 and a first exhaust passage 20. Second power source section 16 may fluidly communicate with a second intake passage 22 and a second exhaust passage 24. In a disclosed embodiment, first intake passage 18 may be fluidly isolated from a second intake passage 22.

It should be understood that system 10 may include forced-induction systems to increase power output and/or control the air-to-fuel ratios within the cylinders of first power source section 14 or second power source section 16. Forced-induction systems may include, for example, turbochargers and/or superchargers. In one embodiment, a first forced-induction system 34, in conjunction with a cooler 48 and a throttle/dump valve 44, may be operably connected with first intake passage 18. In addition, a second forced-induction system 36, in conjunction with air-to-air aftercooler 46, may be operably connected with second intake passage 22.

In an alternative embodiment, first intake passage 18 or second intake passage 22 may be naturally aspirated. A naturally aspirated intake passage might not include forced-induction systems 34, 36. Alternatively, an intake passage may include a forced-induction system, but the forced-induction system may be turned on and off based on demand.

As will be described in more detail below, power system 10 may convert NOx generated by power source 12 into ammonia. This ammonia may be used with a selective catalytic reduction system (SCR system) to remove NOx produced as a byproduct of fuel combustion in the power source 12.

In one exemplary embodiment, the power system 10 may include at least one ammonia-producing catalytic chamber 26 configured to convert at least a portion of the exhaust-gas stream from first power source section 14 into ammonia. This ammonia may be produced by a reaction between NOx and other substances in the exhaust-gas stream from first power source section 14. In order to produce conditions that favor conversion of NOx to ammonia, a fuel-supply device 28 may be configured to supply fuel into first exhaust passage 20. Alternatively, engine controls may be used to produce conditions that favor conversion of NOx to ammonia. For example, conditions favoring conversion of NOx to ammonia may be created by controlling the amount of air entering first power source section 14. The amount of air entering first power source section 14 may be controlled by the modification of the air pressure in inlet 18 through control of forced-induction system 34 and/or throttle valve 44.

It is contemplated that first exhaust passage 20 may fluidly communicate with second exhaust passage 24 at a point downstream of ammonia-producing catalytic chamber 26 to form a merged exhaust passage 30. Merged exhaust passage 30 may contain a mixture of an exhaust-gas stream produced by second power source section 16 and an ammonia-containing, exhaust-gas stream produced by ammonia-producing catalytic chamber 26 in first exhaust passage 20.

A NOx-reducing catalytic chamber 32 may be disposed in merged exhaust passage 30. NOx-reducing catalytic chamber 32 may facilitate a reaction between the ammonia and NOx to at least partially remove NOx from the exhaust-gas stream in merged exhaust passage 30. For example, NOx-reducing catalytic chamber 32 may facilitate a reaction between the ammonia and NOx to produce nitrogen gas and water, among other reaction products. It should be understood that NOx-reducing catalytic chamber 32 may be most efficient when the ration between ammonia and NOx is approximately 1.

Furthermore, second exhaust passage 24 may include an oxidation catalytic chamber 37. NOx may include several oxides of nitrogen including nitric oxide (NO) and nitrogen dioxide ($NO_2$), and NOx-reducing catalytic chamber 32 may function most effectively with a $NO:NO_2$ ratio of 1:1. Oxidation catalytic chamber 37 may be configured to control a ratio of $NO:NO_2$ in second exhaust passage 24.

Additionally, other elements may be installed in the system to supplement the removal of particulates and NOx from the air stream. These elements may include a variety of filters 42 which may be strategically located throughout the system. These filters 42 may include particulate filters. Furthermore, the strategic placement of multiple SCR catalysts may also supplement the removal of particulates and NOx from the air stream.

Typically, the reduction of NOx in conventional engines incurs a fuel economy penalty. This may also be true regarding the reduction of NOx in power source section 16. However, the fuel economy penalty that may be incurred by power source section 16 may be overcome by efficiently increasing the amount of NOx produced in power source section 14. The efficiency of NOx production in power source 14 may be limited by the amount of oxygen in the air entering power source section 14. Utilizing an oxygen separation device 11 that may include polymer membranes or Hilch vortex tubes, may increase the level of oxygen in the air entering power source section 14. Increasing the level of oxygen in the air entering power source section 14 may result in a more efficient production of NOx in power source section 14. This may in turn, lead to an increase of the overall fuel economy of system 10.

The amount of oxygen in the air entering the cylinders may significantly affect the amount of NOx produced by the cylinders. For example, oxygen typically accounts for 21% of ambient air by volume. Oxygen separation device 11 might be able to increase the oxygen content of the air entering first engine cylinder group 14 to 25%, while at the same time reducing the oxygen content of the air entering second engine cylinder group 16 to 18%. An increase of oxygen content to 25% may result in an increase of NOx production by 180%. Further, a decrease in the oxygen content to 18% may result in a decrease in NOx production by over 50%.

In one exemplary embodiment illustrated in FIG. 1, oxygen separation device 11 may include polymer membrane 52, although it should be understood that other oxygen separation techniques may be utilized. Oxygen separation device 11 may include chambers 62 and 64. In the disclosed embodiment, ambient air may enter chamber 64 through an inlet passage 54. Furthermore, compressed air from forced-induction system 36 may enter chamber 62 through an inlet passage 56. Membrane 52 may permit the oxygen from the compressed air in chamber 62 to mix with the air in chamber 64. The air in chamber 64 may then exit oxygen separation device 11 through outlet 60 enriched with oxygen. In addition, the high-oxygen air stream may be routed via an oxygen supplying passage 50 to an inlet passage 68 of forced-induction system 34 and ultimately to first intake passage 18 of first power source section 14. Also, the compressed air in chamber 62 may leave oxygen separation device 11 through an outlet 58 with a lower than ambient concentration of oxygen and may be directed to second intake passage 22 of second power source section 16.

As an option for further reducing NOx emissions produced by second power source section 16, an exhaust gas recirculation system (EGR system) 40 may be operationally connected to exhaust passage 24. Supplemented by filter 42, EGR system 40 may clean and cool a portion of the exhaust gas from second power source section 16 and direct it back to second intake passage 22. The low intake manifold gas temperature from EGR system 40 may ultimately contribute to lower NOx emissions produced by second power source section 16. In addition, a continuously variable valve 38 may allow for the option of not utilizing EGR system 40 when its use is not desired. This disclosed configuration utilizing EGR system 40 may be used by all embodiments employing oxygen separation techniques.

Figure 2:
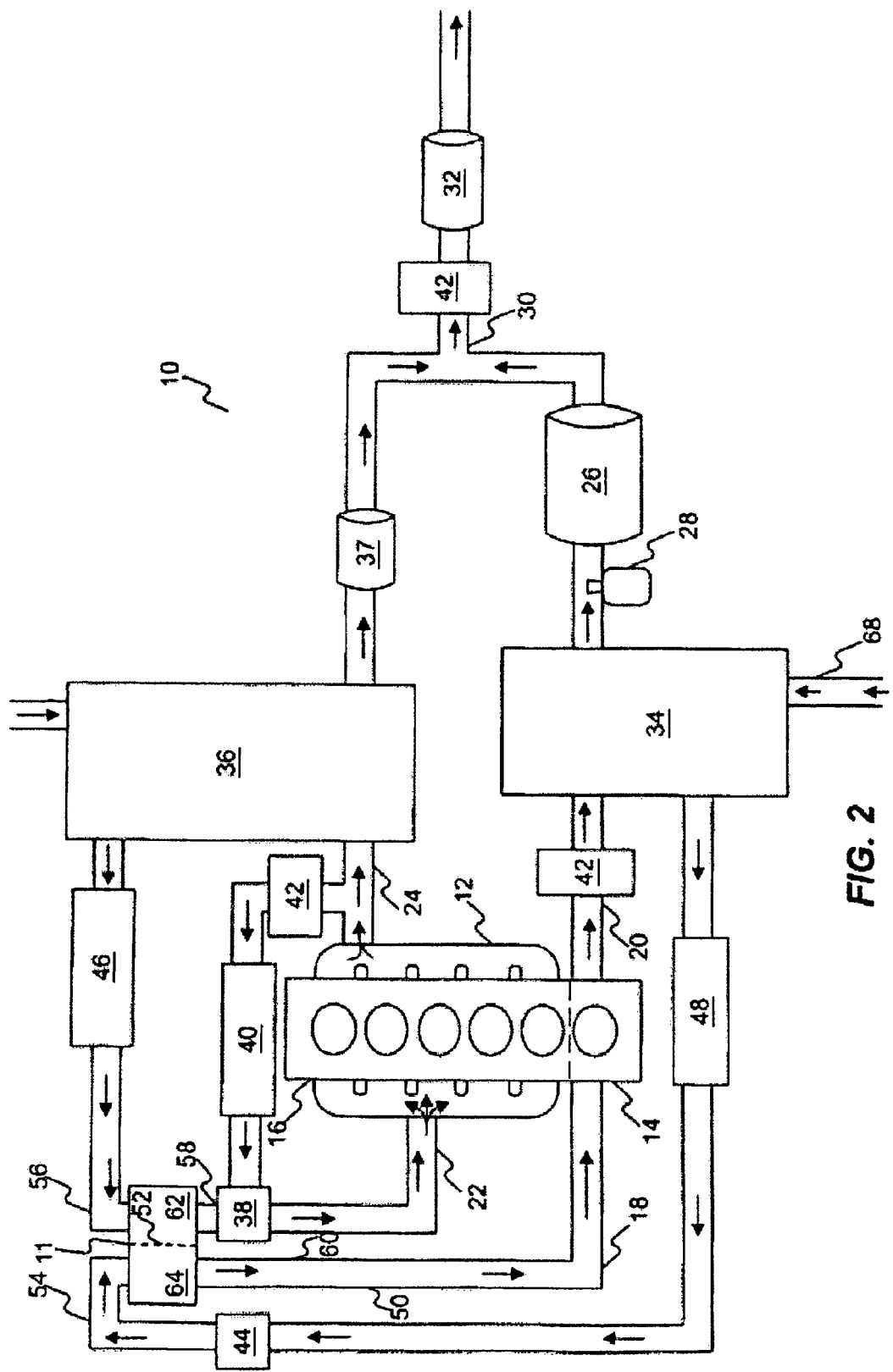
FIG. 2 provides a schematic diagram of a power source according to another exemplary disclosed embodiment of the present disclosure.

In another exemplary embodiment illustrated in FIG. 2, oxygen separation device 11 may include polymer membrane 52. However, just like the embodiment illustrated in FIG. 1, oxygen separation device 11 may utilize other oxygen separation techniques. Oxygen separation device 11 may include chambers 62 and 64. Compressed air from forced-induction system 34 may enter chamber 64 through inlet passage 54. Furthermore, compressed air from forced-induction system 36 may enter chamber 62 through inlet passage 56. It may be preferred that the air pressure in chamber 62 be substantially greater than the air pressure in chamber 64 in order to allow oxygen from the compressed air in chamber 62 to permeate membrane 52 and enter the compressed air in chamber 64. Enriched with oxygen, the compressed air in chamber 64 may leave oxygen separation device 11 through outlet 60 and may be routed via oxygen supplying passage 50 to first intake passage 18 of first power source section 14. At the same time, the compressed air in chamber 62 may leave oxygen separation device 11 through an outlet 58 with a lower than ambient concentration of oxygen. The low-oxygen air stream may be directed to second intake passage 22 of second power source section 16.

Figure 3:
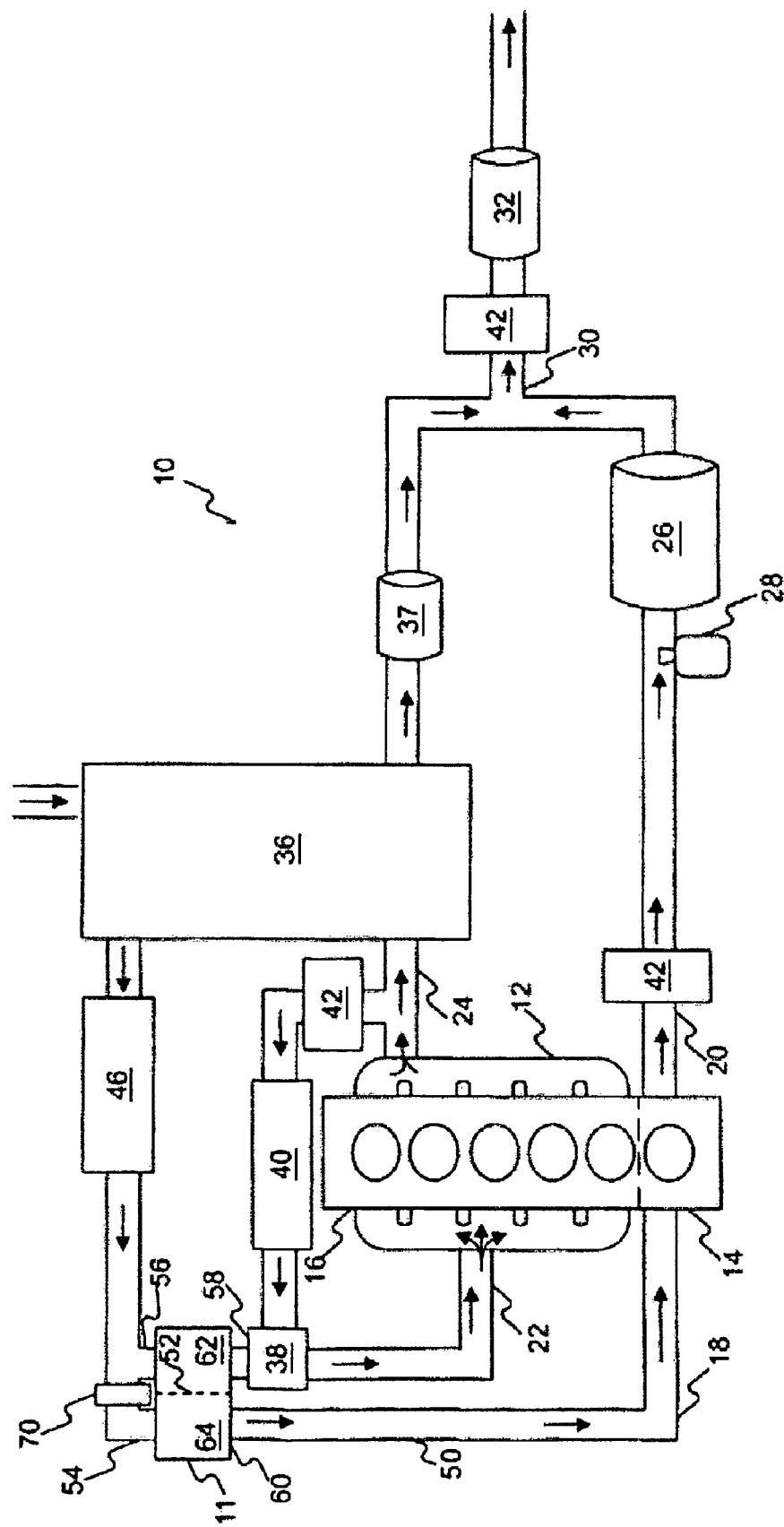
FIG. 3 provides a schematic diagram of a power source according to yet another exemplary disclosed embodiment of the present disclosure.

In an additional exemplary embodiment illustrated in FIG. 3, oxygen separation device 11 may include polymer membrane 52. Similar to the embodiments illustrated in FIGS. 1 and 2, oxygen separation device 11 may utilize other oxygen separation techniques. Oxygen separation device 11 may include chambers 62 and 64. Compressed air from forced-induction system 36 may enter chambers 62 and 64 through inlet passages 56 and 54 respectively. Additionally, the compressed air entering oxygen separation device 11 may be controlled by a control valve 70. It may be preferred that the air pressure in chamber 62 be substantially greater than the air pressure in chamber 64 in order to allow oxygen from the compressed air in chamber 62 to permeate membrane 52 and mix with the compressed air in chamber 64. The compressed air in chamber 64 may leave oxygen separation device 11 through outlet 60 enriched with oxygen and may be routed via oxygen supplying passage 50 to first intake passage 18 of first power source section 14. At the same time, the compressed air in chamber 62 may leave oxygen separation device 11 through outlet 58 with a low concentration of oxygen and may be directed to second intake passage 22 of second power source section 16.

Although several preferred embodiments are illustrated in FIG. 1-3, the power system 10 is not limited to those particular embodiments. The system may contain any number of combinations of forced-induction systems, filters, oxidation catalysts, and clean gas induction systems.

INDUSTRIAL APPLICABILITY

The present disclosure provides a power system 10 including on-board ammonia production utilizing oxygen separation techniques. This purification system may be useful in all engine systems that produce NOx emissions.

Power system 10 of the present disclosure may provide a method for improved control of ammonia production, power output, and NOx emissions. Power system 10 may include power source 12 having high-NOx power source section 14 and conventional power source section 16 with fluidly isolated intake passages 18 and 22. The fluidly isolated intake passages 18 and 22 may be connected to separate forced-induction systems 34 and 36 to rapidly change intake conditions in either one or both power source sections 14 and 16. It should be noted that NOx from the conventional power source section 16 may react with ammonia in NOx-reducing catalytic chamber 32. It may be shown that the reaction between the NOx and ammonia may reduce the amount of NOx exhausted into the ambient air.

Because NOx may be converted to ammonia in ammonia-producing catalytic chamber 26, the amount of NOx produced by high-NOx power source section 14 may be proportional to the amount of ammonia produced in ammonia producing catalytic chamber 26. In addition, the amount of oxygen in the air entering the cylinders may affect the amount of NOx produced by the cylinders. For example, a modest increase in the amount of oxygen supplied to a cylinder group can increase the amount of NOx produced by that cylinder group. Conversely, a modest decrease in the amount of oxygen supplied to a cylinder group can decrease the amount of NOx produced by that cylinder group. Oxygen separation device 11 may be an ideal tool for controlling the amount of oxygen that is supplied to the cylinder groups, which may ultimately control the amount of ammonia that may be produced.

Power system 10 may include a selective catalytic reduction system (SCR system). Utilizing oxygen separation device 11 with an SCR system may be desirable for several additional reasons. The combined system may utilize all of the oxygen supplied to the system, rather than wasting a portion of the supply by discharging it back into the ambient air. In addition, oxygen separation device 11 may improve the SCR system's ability to reduce NOx emissions by reducing the oxygen content of conventional power source section 16 and assisting in the production of on-board ammonia. Furthermore, employing oxygen separation device 11 with an SCR system may save fuel because the combined system may produce rich or lean exhaust gases by varying the oxygen content of the air/fuel mixture rather than varying the fuel content.

It will be apparent to those skilled in the art that various modifications and variations can be made in the disclosed systems and methods without departing from the scope of the disclosure. Other embodiments of the disclosed systems and methods will be apparent to those skilled in the art from consideration of the specification and practice of the embodiments disclosed herein. It is intended that the specification and examples be considered as exemplary only, with a true scope of the disclosure being indicated by the following claims and their equivalents.

What is claimed is:

1. A power system comprising:
   a power source;
   a first power source section having a first intake passage and including at least one cylinder;
   a second power source section having a second intake passage and including at least one cylinder, wherein both intake passages are fluidly isolated from each other; and
   an oxygen separator fluidly connected with each intake passage and configured to use oxygen from the first intake passage to enrich air in the second intake passage.

2. The power system of claim 1, wherein the oxygen separator includes a Hilsch vortex tube.

3. The power system of claim 1, wherein a first forced-induction system is coupled to the first power source section and the oxygen separator.

4. The power system of claim 3, wherein a second forced-induction system is coupled to the second power source section and the oxygen separator.

5. The power system of claim 1, wherein the oxygen separator includes a polymer membrane that creates at least two chambers.

6. The power system of claim 5, wherein an air pressure in a first chamber of the oxygen separator is greater than an air pressure in a second chamber of the oxygen separator.

7. The power system of claim 6, wherein an exhaust gas recirculation system is coupled to the second power source section.

8. The power system of claim 7, wherein an ammonia-producing catalytic chamber is coupled to an exhaust passage of the second power source section.

9. A method of operating a power system comprising:
   supplying air through a first intake passage to a first section of a power source, the first section including at least one cylinder;
   supplying air through a second intake passage to a second section of the power source, the second section including at least one cylinder, the second intake passage being fluidly isolated from the first intake passage;
   separating oxygen from air being supplied to said second intake passage;
   directing the separated oxygen to air being supplied to said first power source section;
   supplying a first exhaust stream to a first exhaust passage in fluid communication with the at least one cylinder of the first power source section; and
   supplying a second exhaust stream to a second exhaust passage in fluid communication with the at least one cylinder of the second power source section.

10. The method of claim 9, further including creating an air pressure in a first chamber of an oxygen separator that is greater than an air pressure in a second chamber of the oxygen separator.

11. The method of claim 10, further including routing a portion of the second exhaust stream back to the second power source section.

12. The method of claim 9, wherein supplying air to the first power source section further includes:
   directing the separated oxygen to a first forced-induction system; and supplying air to the first power source section from said first forced-induction system.

13. The method of claim 12, wherein supplying air to the second power source section further includes:
   directing air from a second forced-induction system to an oxygen separator; and supplying the air to the second power source section from the oxygen separator.

14. The method of claim 13, further including routing a portion of the second exhaust stream back to the second power source section.

15. The method of claim 10, wherein supplying air to the first power source section further includes:
   directing the separated oxygen to a first forced-induction system; and
   supplying air to the first power source section from said first forced-induction system.

16. The method of claim 15, further including
   utilizing an exhaust gas produced by the first section of the power source to produce ammonia in a catalytic chamber.

17. A machine including a power system comprising:
   a power source;
   a first power source section including at least one cylinder with a first intake passage and a first exhaust passage;
   a second power source section including at least one cylinder with a second intake passage and a second exhaust passage, wherein the first intake passage is fluidly isolated from the second intake passage;
   an oxygen separator configured to separate oxygen from air being supplied to the second power source section and direct the separated oxygen to air being supplied to the first power source section;
   a first forced-induction system coupled to the first power source section and oxygen separator; and
   a second forced-induction system coupled to the second power source section and oxygen separator.

18. The power system of claim 17, wherein an ammonia-producing catalytic chamber is coupled to an exhaust passage of the second power source section.

19. The power system of claim 17, wherein the oxygen separator includes a polymer membrane that creates at least two chambers.

20. The power system of claim 1, wherein the air entering the first power source section has a lower concentration of oxygen than the air entering the second power source section.

* * * * *